United States Patent
Weiffen et al.

(10) Patent No.: US 6,860,369 B2
(45) Date of Patent: Mar. 1, 2005

(54) VIBRATION DAMPER WITH VARIABLE DAMPING FORCE

(75) Inventors: Raimund Weiffen, Windeck (DE); Wolfgang Hertz, St. Augustin (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/427,892

(22) Filed: Oct. 26, 1999

(65) Prior Publication Data

US 2002/0011388 A1 Jan. 31, 2002

(30) Foreign Application Priority Data

Oct. 26, 1998 (DE) .......................................... 198 49 221

(51) Int. Cl.⁷ .............................. F16F 9/348; F16F 9/00
(52) U.S. Cl. ................................ 188/282.4; 188/282.2; 188/282.5; 188/313; 188/317; 188/320; 188/322.13
(58) Field of Search ........................... 188/282.1, 282.2, 188/282.4, 282.5, 282.6, 282.8, 317, 319.1, 319.2, 320, 322.15, 322.13, 266.1, 266.2, 266.3, 266.5; 267/64.22

(56) References Cited

U.S. PATENT DOCUMENTS

| | | | | |
|---|---|---|---|---|
| 3,726,368 A | * | 4/1973 | Taylor | 188/289 |
| 4,535,877 A | * | 8/1985 | Shimokura | 188/282.4 |
| 4,632,228 A | * | 12/1986 | Oster et al. | 188/322.15 |
| 4,723,640 A | * | 2/1988 | Beck | 188/282.3 |
| 4,800,995 A | * | 1/1989 | Bernhardt et al. | 188/317 |
| 4,850,461 A | * | 7/1989 | Rubel | 188/322.15 |
| 4,971,180 A | * | 11/1990 | Kobayashi et al. | 188/267 |
| 5,035,306 A | * | 7/1991 | Ashiba | 188/282.6 |
| 5,078,241 A | * | 1/1992 | Ackermann et al. | 188/322.15 |
| 5,205,385 A | * | 4/1993 | Ashiba | 188/282.4 |
| 5,244,063 A | * | 9/1993 | Laurien et al. | 188/317 |
| 5,303,803 A | * | 4/1994 | Grun et al. | 188/282.2 |
| 5,320,375 A | * | 6/1994 | Reeves et al. | 188/282.1 |
| 5,533,597 A | * | 7/1996 | Nezu et al. | 188/280 |
| 5,551,540 A | * | 9/1996 | Forster et al. | 188/267 |

FOREIGN PATENT DOCUMENTS

| | | | | | |
|---|---|---|---|---|---|
| JP | 61-75008 A | * | 4/1986 | | 188/282.2 |
| JP | 6-24228 A | * | 2/1994 | | 188/282.2 |

* cited by examiner

*Primary Examiner*—Thomas Williams
(74) *Attorney, Agent, or Firm*—Cohen, Pontani, Lieberman & Pavane

(57) ABSTRACT

A vibration damper with variable damping force, includes a cylinder filled with damping medium and in which a piston fastened to a piston rod axially moveably therein. The piston divides the working cylinder into two working spaces. The damping force for the directions of rebound and compression are influenced by nonreturn valves acting in the respective directions. A damping valve of variable damping action is additionally provided in series with each of the nonreturn valves so that the damping valve is active in both the rebound and compression directions.

6 Claims, 3 Drawing Sheets

VIBRATION DAMPER WITH VARIABLE DAMPING FORCE

BACKGROUND OF THE INVENTION

1. Field of the Invention

The invention relates to a vibration damper with variable damping force including a cylinder filled with damping medium and a piston fastened to a piston rod arranged in an axially movable manner and dividing the working cylinder into two working spaces, the damping force for the directions of rebound and compression being influenced by nonreturn valves acting in the respective direction and a damping valve of variable damping action.

2. Description of the Related Art

A prior art hydraulic adjustable vibration dampers in which the cylinder filled with a damping medium is divided by a damping piston into two working spaces are known, for example, from German reference DE 35 18 327 C2. The damping piston includes damping valves for the directions of rebound and compression which provide a basic damping of the vibration damper. In addition, a bypass connection is arranged between the lower and upper working spaces in which a pressure-dependent valve and an adjustable valve, actuated by an electromagnet, are provided in series. The adjustable valve provides for the opening and closing of the bypass, while the spring-loaded valve allows the damping medium to pass when the bypass is open and when a specific basic pressure is reached. These two series-arranged valves are respectively active in the rebound and compression stages and operate parallel to the damping valves in the actual damping piston.

A further prior art vibration damper is known from German reference DE 196 24 895 C1 which comprises a cylinder filled with damping medium and in which a piston rod with a piston is configured in an axially movable manner, the piston dividing the cylinder into two working spaces and having appropriate valves for the basic damping. Additionally provided in a bypass at the outer circumference of the cylinder is a pressure-dependently active damping valve, the damping force of which acts on a shut-off valve body against a spring force, by means of an actuator. This damping valve is arranged hydraulically in series with an inlet valve with its own damping action, so that the action of the variable damping valve is superposed with the inlet valve.

SUMMARY OF THE INVENTION

The object of the invention is to develop a vibration damper with variable damping force in such a way that the rolling characteristics and the comfort of vehicles are improved.

To achieve this object, it is provided according to the invention that the damping valve is arranged in series with the first and second non-return valves for both compression and rebound directions, respectively, of the vibration damper.

It is advantageous in the case of this design that, if suitable measures are taken, the basic flow resistance of the damping valve is minimized, in order to involve the series-arranged nonreturn valves in a dominant way in the generation of the soft characteristic. This produces a functional unit in which the series-arranged nonreturn valves take a dominant part in generating the comfort-relevant soft characteristic appropriate for vehicle requirements, with the result that the damping valve then acts only as a force actuator or force controller. The damping valve has the effect of applying a force offset to the soft characteristic generated in dominant part by the nonreturn valves and consequently of generating a characteristic diagram with the desired requirements.

According to a further essential feature, it is provided that the damping valve can be externally activated. Pneumatic, hydraulic, electromagnetic, electromotive, piezoelectric and further forms of activation are possible, for example.

A further refinement provides that at least one of the nonreturn valves is designed as a spring lock washer or as a spring-loaded valve disk. It is advantageous in this case that the damping-force generating features of these nonreturn valves can be designed in the known way of conventional damping valves, for example with constant passages, spring plates etc. and consequently a specifically selected damping force adaptation is possible.

According to an essential design, the damping valve is precontrollable. It is advantageously provided in this case that the precontrollable damping valve is actuated by an electromagnet. Other forms of activation as described above are likewise possible.

A further embodiment provides that the nonreturn valves are accommodated together with their associated valve seats in the piston.

An embodiment which is simple in production engineering terms provides that the nonreturn valves are preassembled with their associated valve seats as a modular unit and are fixed in a positively and/or non-positively and/or integrally locked manner in the piston.

To achieve a compact modular unit, which can be correspondingly preassembled, if appropriate, it is provided according to a particularly favorable embodiment that the nonreturn valves and the damping valve are arranged in the piston.

According to an essential feature, it is provided that the nonreturn valves communicate with one of the working spaces and the damping valve actuates at least one flow connection to the other working space.

A further refinement provides that the damping valve has a valve body which is precontrolled at least in one direction and directly controlled via an actuator in the opposite direction.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
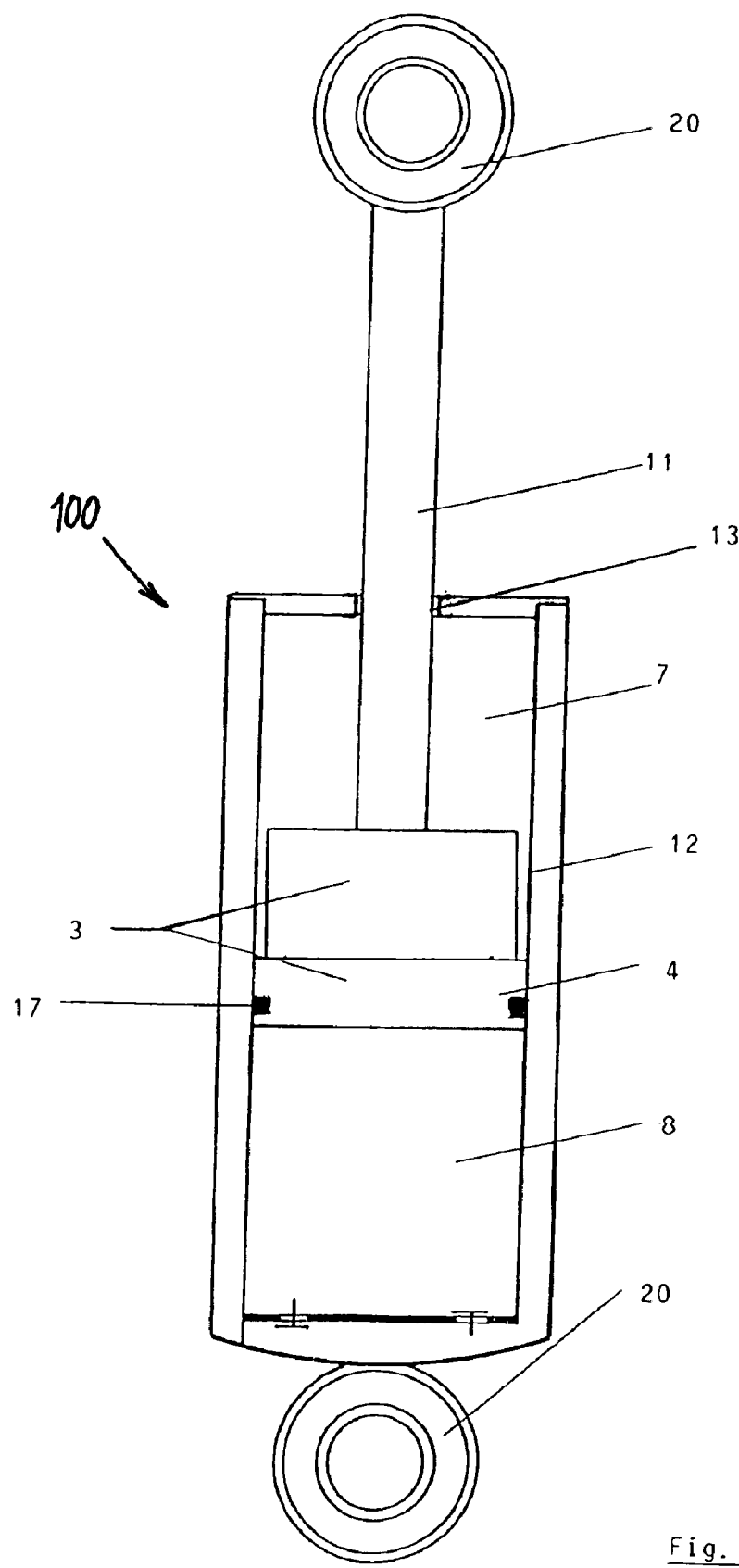
FIG. 1 is a longitudinal sectional diagram showing a vibration damper according to the present invention.

A vibration damper 100 according to an embodiment of the present invention is shown in FIG. 1 and comprises a working cylinder 12 with a piston 4 arranged therein. The piston 4 divides the working cylinder 12 into an upper working space 7 and a lower working space 8 and is connected to a piston rod 11 that passes through a sealing/guiding unit 13 at one end of the working cylinder 12 to the outside. The vibration damper 100 includes fastening elements 20 for fastening the vibration damper 100 between a vehicle body and the chassis suspension. An external surface of the piston 4 is sealed with respect to an internal surface of the working cylinder 12 by a sealing element 17.

Figure 2:
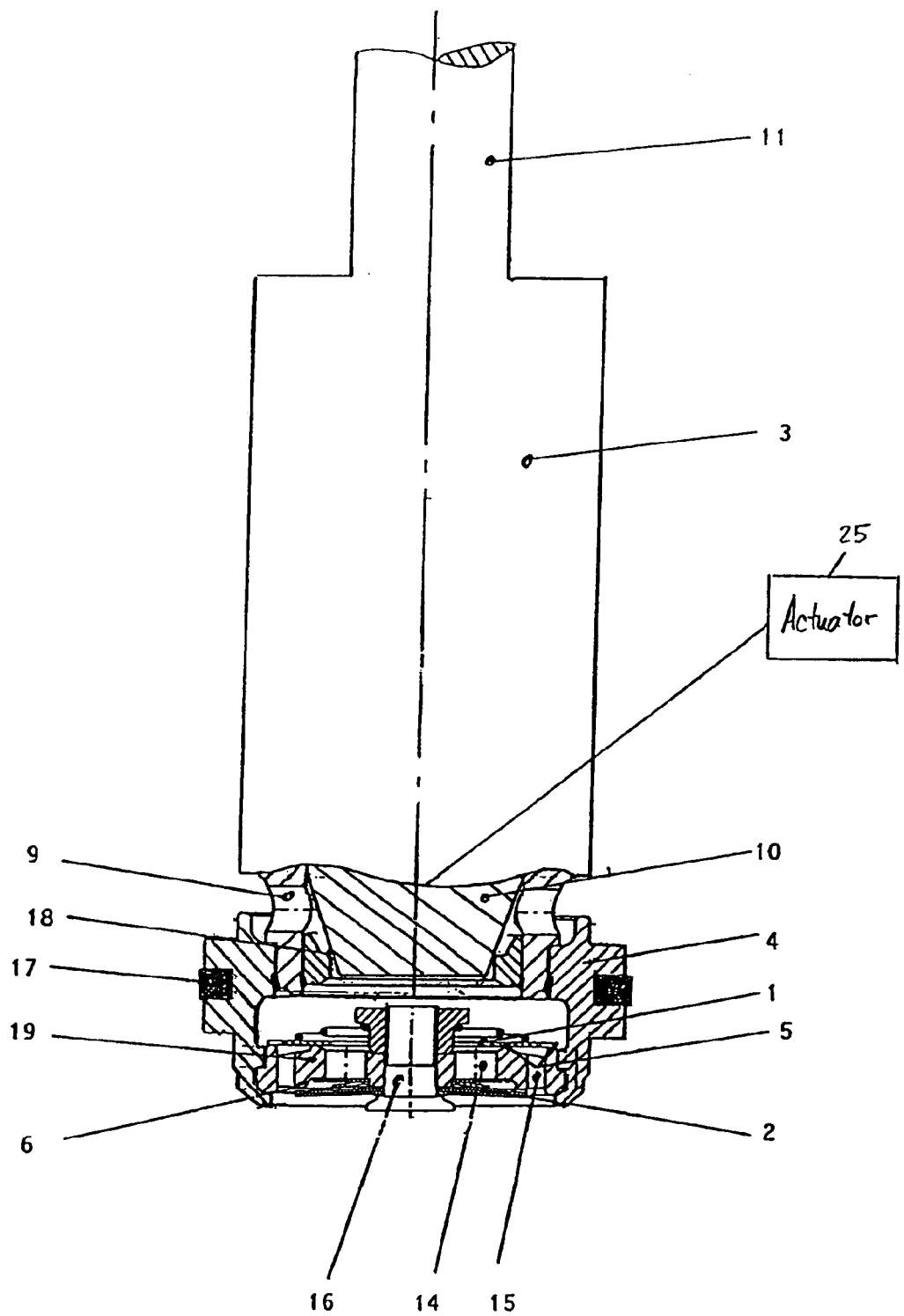
FIG. 2 is an enlarged, more detailed view of a damping valve together with the nonreturn valves arranged hydraulically in series in the vibration damper of FIG. 1.

A damping valve 3 is fastened to the piston rod 11 and/or piston 4 with first and second nonreturn valves 1 and 2 as represented in FIG. 2, wherein the piston 4 includes the first and second nonreturn valves 1 and 2. The first nonreturn valve 1 is intended for the compression-stage function and the second nonreturn valve 2 is intended for the rebound-stage function of the piston 4 in the vibration damper 100. The damping valve 3 may be arranged in either the piston 4 or the piston rod 11 in series with the first and second nonreturn valves 1 and 2 so that the damping valve 3 is active in both the compression stage and rebound stage of the piston 4. A valve body 19 of the piston 4 comprises valve seats 5 and 6 corresponding to the first and second nonreturn valves 1 and 2, which are also arranged on the valve body 19.

In FIG. 2, the fastening of the nonreturn valves 1 and 2 to the valve body 19 is represented, by way of non-limiting example, as a screwed connection 16. Other fastening methods may also be used to fasten the first and second nonreturn 5, 6 valves and to the valve body 19.

As represented in FIG. 2, the valve body 19 with nonreturn valves 1 and 2 may be accommodated in a positively locked manner in the piston 4. Alternatively, the valve body 19 may also be accommodated in a non-positively, frictionally or integrally locked manner. As described above and shown in more detail in FIG. 2, the sealing element 17 seals the piston 4 with respect to an inner surface of the working cylinder 12.

The damping valve 3 includes a damping valve body 10 that is arranged to work with a damping valve seat 18. In the example shown in FIG. 2, the damping valve seat 18 comprises a conical seat, but other suitable configurations are conceivable.

The damping valve 3 is externally activatable by an actuator 25, thereby allowing the hydraulic force necessary on the valve body 10 for opening the valve, or the hydraulic valve resistance, to be changed.

The flow connection between the upper working space 7 and the lower working space 8 when the damping valve 3 is open, i.e., when the damping valve body 10 is lifted off the valve seat 18, is obtained for the rebound stage via the through-opening 9, the through-opening 14 and the nonreturn valve 2 of the valve body 19. For the compression stage, the flow connection between the upper working space 7 and the lower working space 8 is provided via the through-opening 15 and the nonreturn valve 1 as well as the through-opening 9.

Figure 3B:
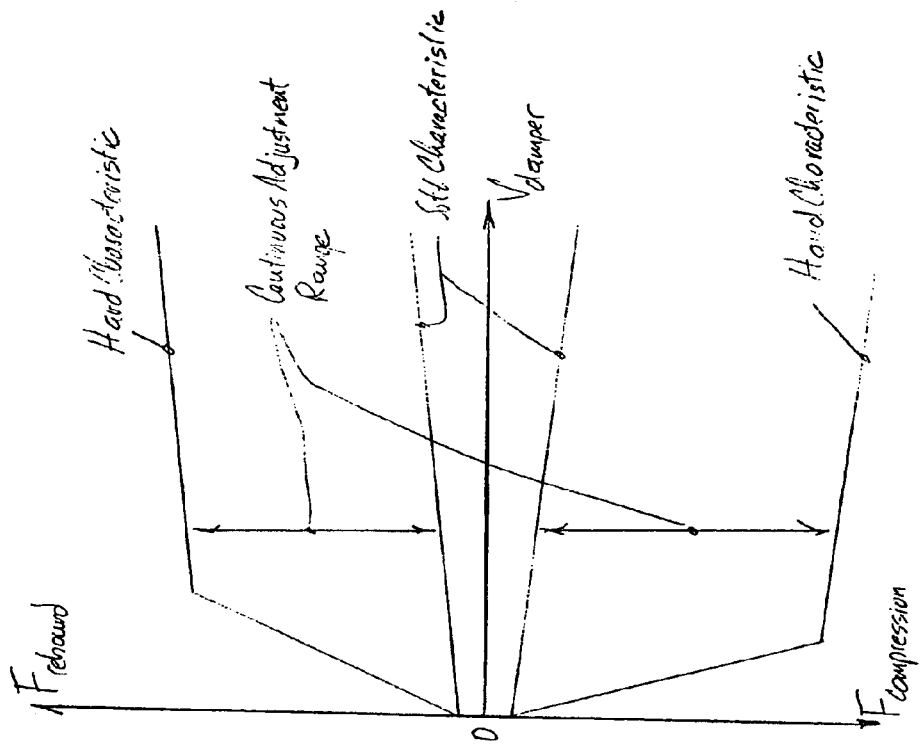
FIGS. 3a and 3b are graphs showing the basic way in which the characteristic diagram/characteristics of the vibration damper of FIGS. 1 and 2 can be arranged according to the invention.
Figure 3A:
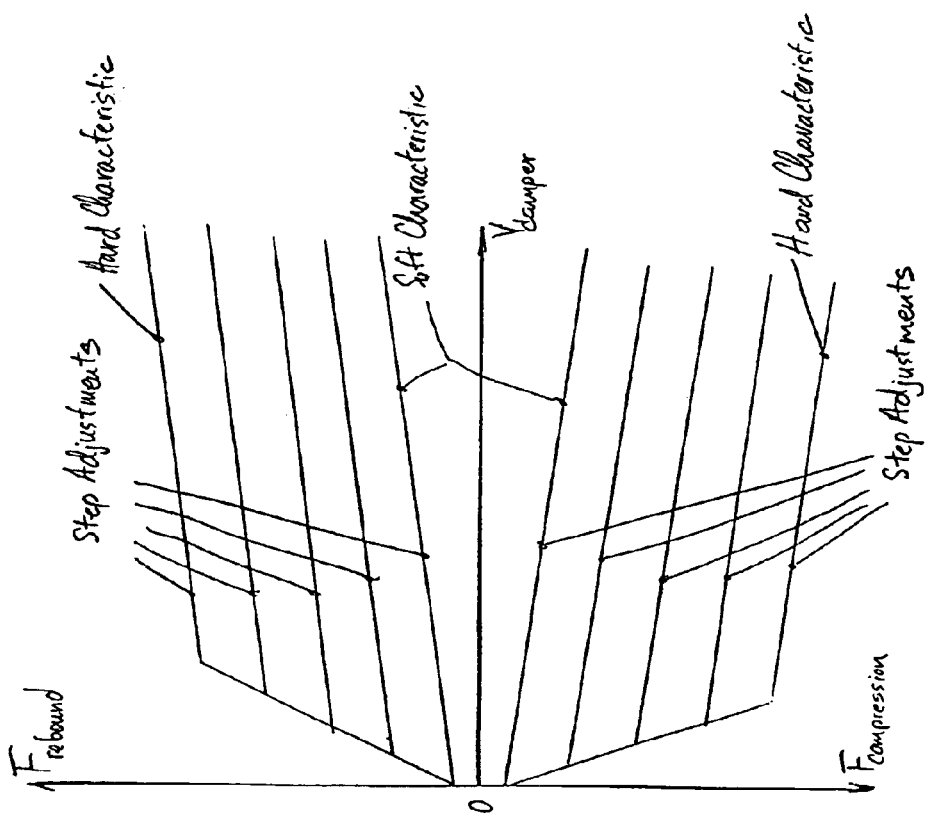

FIGS. 3a and 3b show how the adjustment of the damping valve 3 affects the characteristics of the vibration damper 100. FIG. 3a shows the results of a damping valve that is adjustable via the actuator in steps. In this embodiment, the vibration damper characteristics may be set to any one of the step adjustments. FIG. 3b shows the results of a damping valve that is continuously adjustable via the actuator. In this embodiment, the vibration damper characteristic is adjustable to any level within the continuous adjustment range.

The comfort-relevant soft characteristic in the rebound and compression stages is generated in dominant part by means of the features of the first nonreturn valve 1 for the compression stage and of the second nonreturn valve 2 for the rebound stage. The stepped or continuous adjustment of the damping valve 3 may be used to apply a compression or force to offset the soft characteristic of the first and second nonreturn valves 1 and 2, with the result that a family of characteristics or a continuous characteristic diagram may be obtained for the rebound-stage and compression-stage functions.

It is also possible for the characteristic of the damping valve 3 to be pre-set or pre-controlled in one of the rebound or the compression direction and controllable via the actuator in the other of the rebound or the compression direction.

The invention is not limited by the embodiments described above which are presented as examples only but can be modified in various ways within the scope of protection defined by the appended patent claims.

We claim:

1. A vibration damper with variable damping force, comprising:

a working cylinder filled with damping medium;

a piston fastened to a piston rod arranged in an axially movable manner in said working cylinder and dividing the working cylinder into two working spaces;

first and second non-return valves arranged in said piston for respectively providing a damping force for the rebound and compression directions of the vibration damper, the damping force of said first and second non-return valves generating a soft characteristic of said vibration damper, and a damping valve arranged in said piston and comprising a valve body and a valve seat defining a flow path therebetween, said damping valve having a selectively adjustable variable damping action and arranged in series with each of said first and second non-return valves so that the variable damping action offsets the soft characteristic generated by the damping force provided by each of said first and second non-return valves, said damping valve being operatively arranged for providing a precontrolled damping force setting in at least one of the rebound direction and the compression direction, said valve body being precontrollable to a precontrolled setting in one of said rebound and compression directions and directly controllable via an actuator in the other of said rebound and compression directions, wherein said damping valve in series with said first and second non-return valve comprise a sole passage for said damping medium through said piston arid between said two working spaces such that said damping medium is required to flow through said flow path of said damping valve in a first direction when damping medium is exchanged between said two working spaces in the rebound direction and said damping medium is required to flow through said flow path of said damping valve in a second direction when damping medium is exchanged between said two working spaces in the compression direction of the vibration damper, said second direction opposing said first direction, and wherein said first and second non-return valves communicate with one of said upper and lower working spaces and said damping valve actuates via at least one flow connection to the other of said tinner and lower working spaces.

2. The vibration damper of claim 1, wherein said damping valve comprises an externally activated actuator for adjusting said variable damping action.

3. The vibration damper of claim 1, wherein at least one of said first and second non-return valves comprises an element from the group consisting of a spring lock and a spring-loaded valve disk.

4. The vibration damper of claim 1, wherein said first and second non-return valves are preassembled with their associated valve seats as a modular unit and are fixedly connected in said piston.

5. The vibration damper of claim 2, wherein said actuator for said damping valve comprises an electromagnet.

6. The vibration damper of claim 1, wherein said first and second non-return valves are accommodated together with their associated valve seats in said piston.

* * * * *